(12) United States Patent
Bolignari et al.

(10) Patent No.: US 12,539,602 B2
(45) Date of Patent: Feb. 3, 2026

(54) SYSTEM FOR THE REMOTE ACTUATION OF ARTICULATED MECHANISMS

(71) Applicants: SCUOLA SUPERIORE DI STUDI UNIVERSITARI E DI PERFEZIONAMENTO SANT'ANNA, Pisa (IT); Marco Bolignari, Florence (IT)

(72) Inventors: Marco Bolignari, Florence (IT); Marco Fontana, Leghorn (IT); Francesco Damiani, Leghorn (IT)

(73) Assignees: SCUOLA SUPERIORE DI STUDI UNIVERSITARI E DI PERFEZIONAMENTO SANT'ANNA, Pisa (IT); Marco Bolignari, Florence (IT)

( * ) Notice: Subject to any disclaimer, the term of this patent is extended or adjusted under 35 U.S.C. 154(b) by 5 days.

(21) Appl. No.: 18/835,619

(22) PCT Filed: Feb. 3, 2023

(86) PCT No.: PCT/IB2023/050998
§ 371 (c)(1),
(2) Date: Aug. 2, 2024

(87) PCT Pub. No.: WO2023/148685
PCT Pub. Date: Aug. 10, 2023

(65) Prior Publication Data
US 2025/0135634 A1   May 1, 2025

(30) Foreign Application Priority Data
Feb. 4, 2022  (IT) .................. 102022000002075

(51) Int. Cl.
*B25J 9/00*  (2006.01)
*B25J 9/14*  (2006.01)
*B25J 19/00*  (2006.01)

(52) U.S. Cl.
CPC ........... *B25J 9/146* (2013.01); *B25J 19/0004* (2013.01)

(58) Field of Classification Search
CPC . B25J 9/146; B25J 19/0004; B25J 3/02; B25J 9/14
See application file for complete search history.

(56) References Cited

U.S. PATENT DOCUMENTS

2019/0366999 A1\* 12/2019 Emde ..................... B60T 8/00

FOREIGN PATENT DOCUMENTS

| DE | 38 06 333 A1 | 9/1989 |
| WO | 00/07781 A1 | 2/2000 |

(Continued)

OTHER PUBLICATIONS

Girard, A. et al., "A Two-Speed Actuator for Robotics with Fast Seamless Gear Shifting," 2015 IEEE/RSJ International Conference on Intelligent Robots and Systems (IROS), pp. 4704-4711 (2015).

(Continued)

*Primary Examiner* — Ian Jen
(74) *Attorney, Agent, or Firm* — Maschoff Brennan

(57) ABSTRACT

A system for the remote actuation of articulated mechanisms comprising at least one actuated group comprising a mechanical joint having at least one degree of freedom and at least one receiving hydraulic cylinder connected to the mechanical joint. The system also comprises a hydraulic transmission comprising, for each actuated group, a first hydraulic line and a second hydraulic line arranged to actuate each receiving hydraulic cylinder in order to generate a mechanical action on the mechanical joint proportional (Continued)

to a pressure difference $\Delta P = P_1 - P_2$, where $P_1$ is the fluid pressure in the first hydraulic line and $P_2$ is the fluid pressure in the second hydraulic line.

15 Claims, 9 Drawing Sheets

(56) References Cited

FOREIGN PATENT DOCUMENTS

| WO | 2018/218336 A1 | 12/2018 |
|---|---|---|
| WO | 2020/123833 A1 | 6/2020 |

OTHER PUBLICATIONS

Whitney, J.P. et al., "A Hybrid Hydrostatic Transmission and Human-Safe Haptic Telepresence Robot," 2016 IEEE International Conference on Robotics and Automation (ICRA), pp. 690-695 (2016).

Véronneau, C. et al., "A Lightweight Force-Controllable Wearable Arm Based on Magnetorheological-Hydrostatic Actuators," 2019 International Conference on Robotics and Automation (ICRA), pp. 4018-4024 (2019).

Bolignari, M. et al., "Design and experimental characterization of a high performance hydrostatic transmission for robot actuation" Meccanica, vol. 55, Issue 5, pp. 1169-1179 (2020).

Véronneau, C. et al., "Multifunctional Remotely Actuated 3-DOF Supernumerary Robotic Arm Based on Magnetorheological Clutches and Hydrostatic Transmission Lines," IEEE Robotics and Automation Letters, vol. 5, Issue 2, pp. 2546-2553 (2020).

Denis, J. et al., "Low-Level Force-Control of MR-Hydrostatic Actuators," IEEE Robotics and Automation Letters, vol. 6, Issue 2, pp. 3849-3856 (Apr. 2021).

* cited by examiner

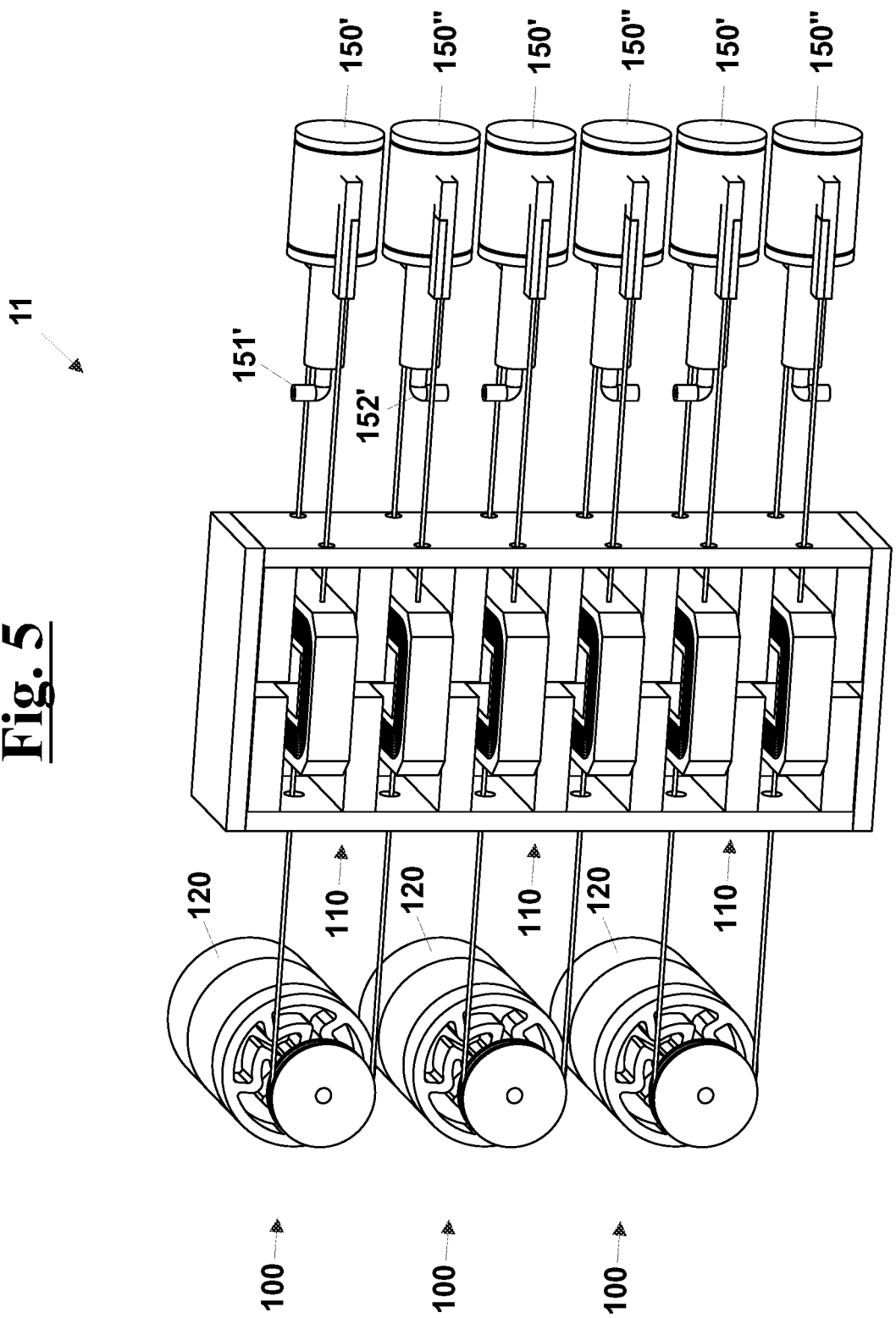

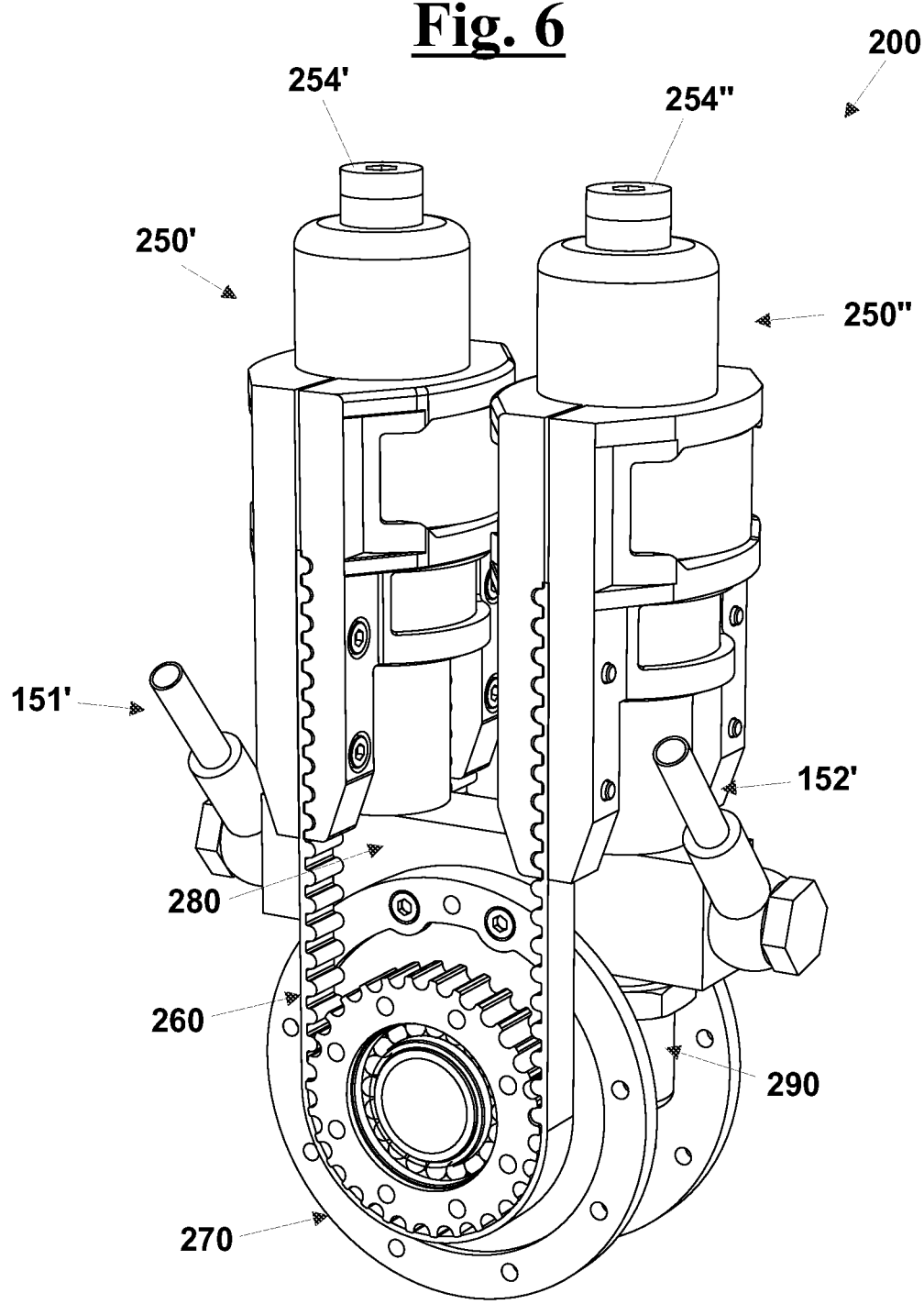

SYSTEM FOR THE REMOTE ACTUATION OF ARTICULATED MECHANISMS

FIELD OF THE INVENTION

The present invention relates to the field of remote actuation of articulated mechanisms.

In particular, the invention relates to a system for the remote actuation of industrial robots or other mechanical utilities through the use of hydrostatic transmissions.

DESCRIPTION OF THE PRIOR ART

Hydrostatic transmissions have recently offered the prospect of reconciling the characteristics of speed and repeatability typical of industrial robots with the characteristics of high interactivity and safety typical of collaborative robots.

Unlike alternative solutions for the remote actuation of robotic joints, hydrostatic transmissions provide particular simplicity of integration into the robotic structure, with additional characteristics of modularity, reduced cost, measurement, construction and assembly simplicity.

Some examples of systems for robotic actuation by hydrostatic transmission are shown for example in Whitney et al, A hybrid hydrostatic transmission and human-safe haptic telepresence robot, 2016, DOI: 10.1109/ICRA.2016.7487195 and Véronneau et al, A Lightweight Force-Controllable Wearable Arm Based on Magnetorheological-Hydrostatic Actuators, 2019, DOI: 10.1109/ICRA.2019.8793978.

A further example is shown in M. Bolignari and M. Fontana, Design and experimental characterization of a high performance hydrostatic transmission for robot actuation, 2020, DOI: 10.1007/s11012-020-01143-z. This document describes a system for transmitting a hydrostatic torque between an actuation unit located remotely and one or more robots to be moved. In particular, the solution is based on a particular floating cylinder architecture (rolling diaphragm hydrostatic transmission) which makes it possible to reduce friction in the transmission, produce high torques and guarantee low overall dimensions and production costs.

However, in all the documents cited a compromise is not found between the speed of execution of the movement, essential for accelerating the industrial processes, and the controllability of the generated torques, essential for conferring high dexterity to the movement and safe interaction with the operators.

As known, in fact, the actuators usually used to actuate robotic systems are characterized by a high mechanical impedance (gearmotors, hydraulic cylinders, etc.), so as to produce torques/forces sufficient to support the weight of the robot and any objects connected to it. However, these actuators, due to the high inertia, are unsafe in interaction with human operators and usually have a low actuation band.

On the other hand, the use of actuators with low mechanical impedance (direct-drive electric motors, moving coil motors, etc.) allows the creation of mechanical systems that are safer in interaction with man and with a wide actuation band, but generally provide too low torque/force to support the robot's weight or manipulate objects.

Therefore, there is a need to provide an actuation system which allows at the same time to obtain high performance and a high level of safety in the interaction.

Furthermore, to date, despite the high flexibility shown by hydrostatic technology and the conception of numerous implementation and/or application variants, each single robotic joint is remotely connected to the relative electric motor by means of a single hydrostatic transmission. This structure is still unchanged in the current state of the art and the presence of a certain number of robotic joints always implies the use of an at least equivalent number of electric motors.

SUMMARY OF THE INVENTION

It is therefore a feature of the present invention to provide a system for the remote actuation of articulated mechanisms which allows to guarantee a generation of high torques at low frequencies and modest torques at high frequencies, allowing simultaneously to move substantial loads with a good speed of execution and a high accuracy of position and force.

It is also a feature of the present invention to provide such a system which ensures high safety of interaction with human operators.

It is also a feature of the present invention to provide such a system which allows the use of a single actuator for the alternate actuation of multiple mechanical joints.

These and other objects are achieved by a system for the remote actuation of articulated mechanisms, the system comprising:
  at least one actuated group comprising:
    a mechanical joint having at least one degree of freedom;
    at least one receiving hydraulic cylinder connected to the mechanical joint;
  a hydraulic transmission comprising, for each actuated group, a first hydraulic line and a second hydraulic line arranged to actuate said or each receiving hydraulic cylinder in order to generate a mechanical action on the mechanical joint proportional to a pressure difference $\Delta P = P_1 - P_2$, where $P_1$ is the fluid pressure in the first hydraulic line and $P_2$ is the fluid pressure in the second hydraulic line;
  an actuation unit comprising at least one actuation group configured for being connected to a respective actuated group by the first hydraulic line and the second hydraulic line, said or each actuation group comprising at least one transmission hydraulic cylinder which is adapted to vary the pressure difference $\Delta P$ present between the first hydraulic line and the second hydraulic line;
  said or each actuation group comprising a first actuator arranged to actuate said or each transmission hydraulic cylinder in order to generate a pressure difference $\Delta P = \Delta P_L$,
  whose main feature is that said or each actuation group also comprises a second actuator arranged to actuate said or each transmission hydraulic cylinder in order to generate a pressure difference $\Delta P = \Delta P_H > 5 * \Delta P_L$.

Advantageously, the second actuator is a pneumatic actuator.

Alternatively, the second actuator is a hydraulic actuator

In particular, the second actuator is an electric actuator having a speed reducer with a reduction ratio higher than 10.

Advantageously, the second actuator is connected in series with an elastic element. Thanks to the elastic element, the actuation group of the present invention allows the torques produced by the first actuator and the second actuator to be separated in frequency. In particular, the first actuator allows the generation of low torques up to high frequencies, providing high actuation speed on the mechanical joint, while the second actuator allows the generation of high torques at low frequencies, increasing the load capacity of the system without increasing its inertia.

In particular, the first actuator is an electric actuator having a speed reducer with a reduction ratio less than 10.

Advantageously, the first actuator is a voice coil actuator.

In particular, the first actuator comprises two coils superimposed on each other, in order to share a same magnetic field.

Alternatively, the second actuator is arranged to convert elastic and/or gravitational potential energy in a mechanical action on said or each transmission hydraulic cylinder in order to generate the pressure difference $\Delta P_H$.

Advantageously, said or each actuated group comprises:
a first receiving hydraulic cylinder arranged to actuate the mechanical joint in a first direction;
a second receiving hydraulic cylinder arranged to actuate the mechanical joint in a second direction.

In particular, said or each actuation group comprises a first transmission hydraulic cylinder and a second transmission hydraulic cylinder.

Advantageously, the first transmission hydraulic cylinder is adapted to be connected to a respective first receiving hydraulic cylinder by a respective first hydraulic line and the second transmission hydraulic cylinder is adapted to be connected to a respective second receiving hydraulic cylinder by a respective second hydraulic line.

In particular, the first receiving hydraulic cylinder and the second receiving hydraulic cylinder are connected by means of a belt to a pulley arranged to rotate due to the alternating movement of the receiving hydraulic cylinders.

In particular, the first transmission hydraulic cylinder and the second transmission hydraulic cylinder are connected by means of a belt to a pulley arranged to be rotated by the first actuator and by the second actuator producing a relative position variation between the transmission hydraulic cylinders.

Advantageously, the actuation unit comprises at least two actuation groups and the system is arranged to actuate at least two mechanical joints.

In particular, the at least two voice coil actuators are superimposed on each other, in order to share a same magnetic field.

In particular, a switching system is also provided arranged to allow the connection of an actuation group alternatively, with the hydraulic lines of at least two mechanical joints.

BRIEF DESCRIPTION OF THE DRAWINGS

The invention will be now shown with the following description of its embodiments, exemplifying but not limitative, with reference to the attached drawings in which:

FIG. 5 shows a possible embodiment of the actuation unit of the system wherein three actuation groups are provided with stacked voice coil actuators;

FIG. 6 shows a possible mechanical solution of an actuated group;

DESCRIPTION OF SOME PREFERRED EMBODIMENTS

Figure 1A:
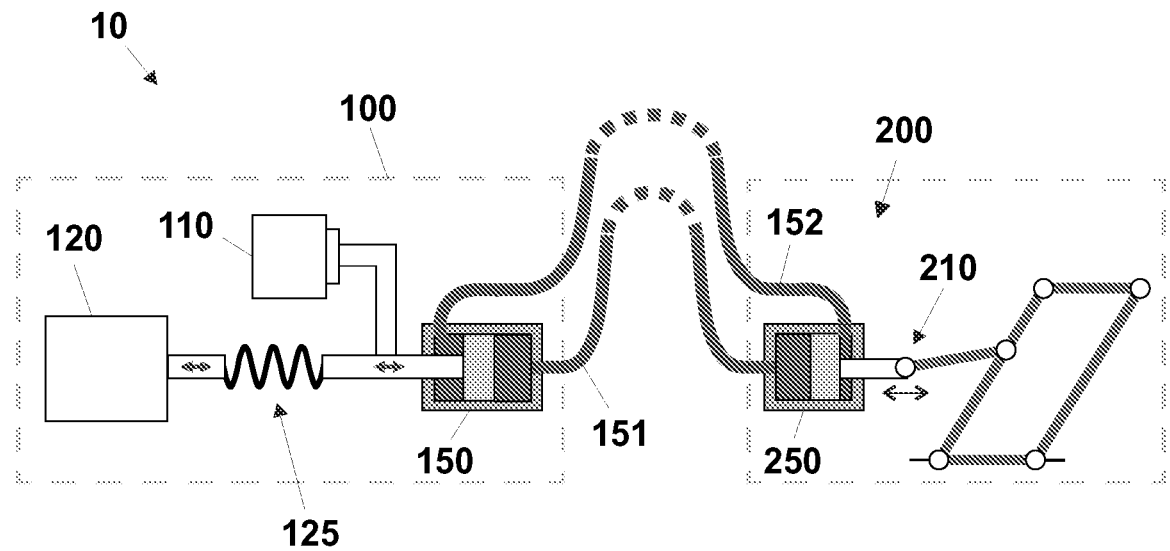
FIG. 1A diagrammatically shows a first embodiment of the system for the remote actuation of articulated mechanisms according to the present invention, wherein a single transmission hydraulic cylinder and a single receiving hydraulic cylinder are provided.

In FIG. 1A a first embodiment is diagrammatically shown of the system 10 for the remote actuation of articulated mechanisms, according to the present invention, wherein an actuation group 100 is provided connected, in use, to an actuated group 200.

In particular, the actuation group 100 comprises a first actuator 110 and a second actuator 120, both connected to a single transmission hydraulic cylinder 150. The chambers of the transmission hydraulic cylinder 150 are connected by means of respective hydraulic lines 151 and 152 to a respective receiving hydraulic cylinder 250 disposed in the actuated group 200.

The actuators 110 and 120 are configured to actuate the cylinder 150 in order to generate a pressure difference $\Delta P$ between the first hydraulic line 151 and the second hydraulic line 152. Such pressure difference $\Delta P$ allows the operation of the receiving hydraulic cylinder 250 that, consequently, produce a mechanical action on the mechanical joint 210 proportional to the pressure difference $\Delta P$ itself. Such mechanical action can be in particular a force or a torque.

In particular, the first actuator 110 is adapted to generate a pressure difference between the hydraulic lines equal to $\Delta P = \Delta P_L$, whereas the second actuator 120 is adapted to generate a pressure difference $\Delta P = \Delta P_H > 5 * \Delta P_L$. This way, the mechanical action which the receiving hydraulic cylinder 250 produce on the mechanical joint 210 due to the effect of the pressure difference $\Delta P_H$ produced by the second actuator 120 is at least 5 times greater than the mechanical action produced due to the pressure difference $\Delta P_L$ produced by the first actuator 110.

Furthermore, the present invention provides that the second actuator 120 comprises or is connected to a mechanical compliance. This mechanical compliance can be introduced, for example, by using a pneumatic actuator as the second actuator 120. Alternatively, as shown in FIG. 1A, the second actuator 120 can be placed in series with an elastic element 125.

Thanks to the mechanical compliance of the actuator 120 or of the elastic element 125, the actuation group 100 of the present invention allows to separate in frequency the torques produced by the first actuator 110 and by the second actuator 120. In particular, the first actuator 110 allows the generation of non-high torques at high frequencies, providing high actuation speed on the mechanical joint 210, while the second actuator 120 allows the generation of high torques at low frequencies, increasing the load capacity of the system without increasing its inertia.

Figure 1B:
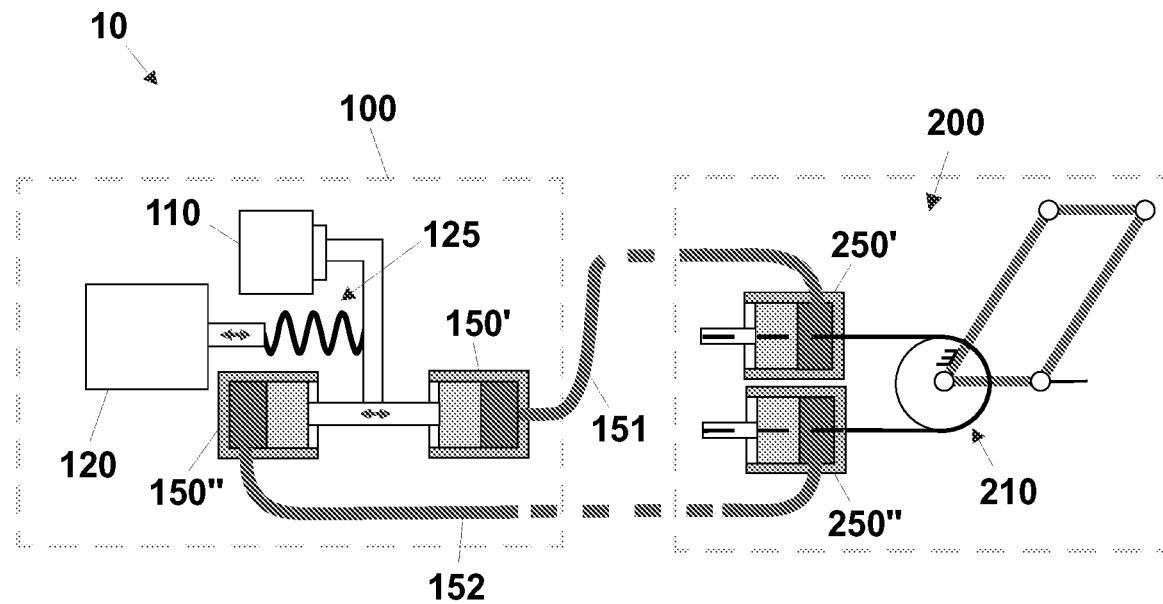
FIG. 1B diagrammatically shows a second embodiment of the system for the remote actuation of articulated mechanisms according to the present invention, wherein two transmission hydraulic cylinders and two receiving hydraulic cylinders are provided.

FIG. 1B shows a variant embodiment of the invention in which the actuated group 200 comprises a first receiving hydraulic cylinder 250' suitable for moving the mechanical joint 210 in a first direction and a second receiving hydraulic cylinder 250" suitable for moving the mechanical joint 210 in a second verse. Furthermore, the actuation group 100 comprises a first transmission hydraulic cylinder 150' and a second transmission hydraulic cylinder 150" able to be connected to the respective receiving hydraulic cylinders 250', 250" by means of respective hydraulic lines 151,152.

The use of a pair of hydraulic cylinders, instead of a single cylinder, allows the use of flexible mechanical transmissions (for example belts, chains, cables, etc.) to transform the linear motion of the cylinder into a rotary motion of the joint. This solution allows to obtain geometrically advantageous dimensions compatible with robotic applications.

According to the present invention, the system 10 can also provide for the presence of a transmission hydraulic cylinder 150 connected to two separate receiving hydraulic cylinders 250',250" or, vice versa, two transmission hydraulic cylinders 150',150" connected to the two chambers of the same receiving hydraulic cylinder 250.

Figure 2A:
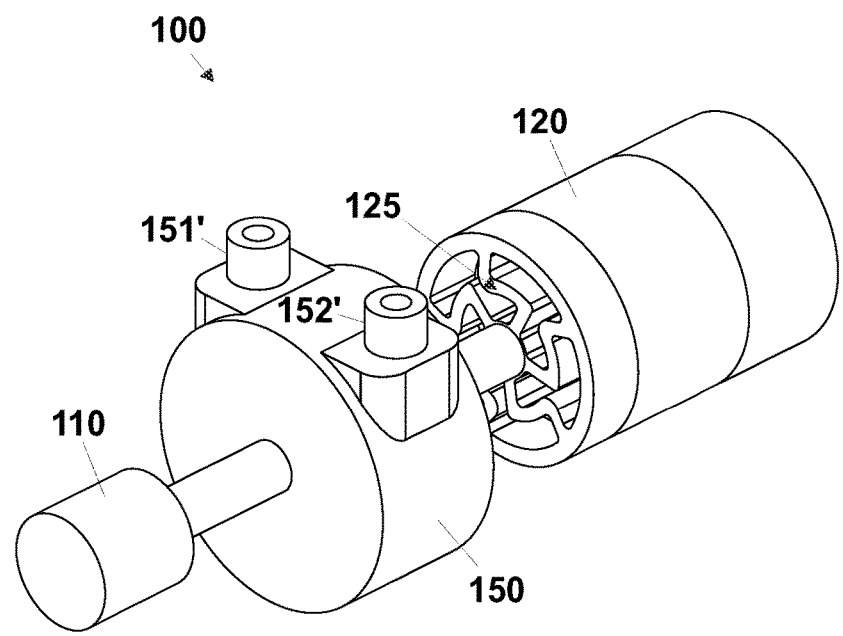
FIG. 2A shows a possible embodiment of an actuation group of the system, wherein a single rotary transmission hydraulic cylinder is provided.
Figure 2B:
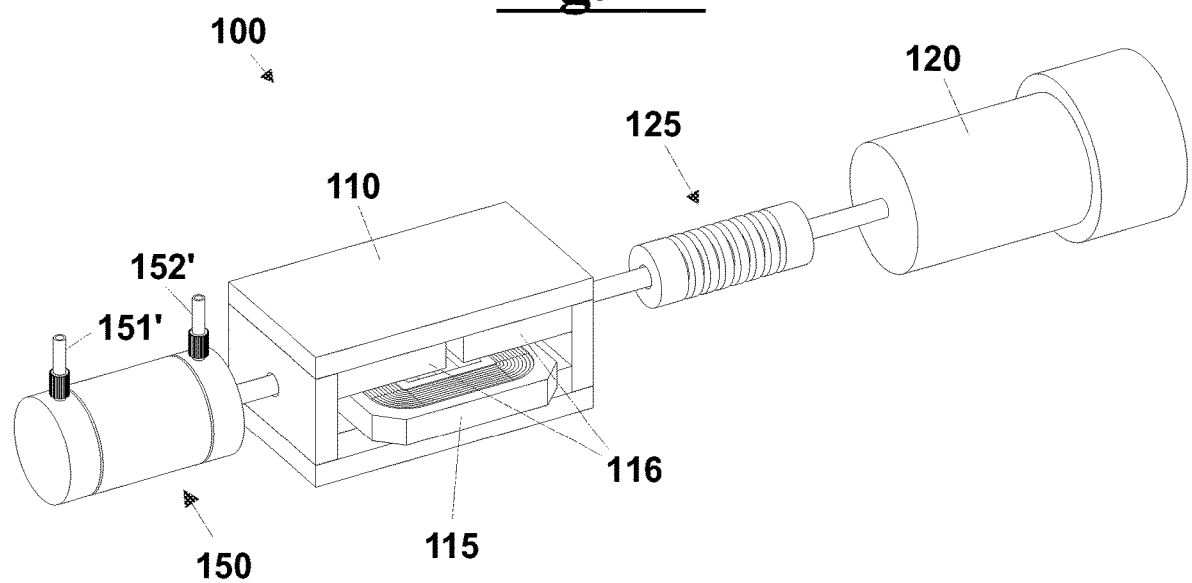
FIG. 2B shows a possible embodiment of an actuation group of the system, wherein a single transmission hydraulic cylinder is provided and wherein the first actuator is a voice coil actuator.

In the FIGS. 2A and 2B possible embodiments are shown of the actuation group 100, in which there is a single transmission hydraulic cylinder 150, similarly to what is shown in the diagram of FIG. 1A.

In particular, in the solution of FIG. 2A, both the first actuator 110 and the second actuator 120 are rotational actuators capable of producing torques which are transmitted to the axis of the rotary hydraulic cylinder 150. In particular, the actuators 110 and 120 rotate the septum of the hydraulic cylinder 150, of toroidal shape, so as to produce the desired pressure difference ΔP between the hydraulic lines 151 and 152, suitable for being connected to the outlets 151' and 152'. Furthermore, in this embodiment, the second actuator 120 is placed in series with an elastic element 125 of the torsional type so as to decouple the inertia of the actuator 120 in dynamic regimes and protect this actuator from any dynamic overloads.

In this embodiment, the actuators 110 and 120 could both be electric actuators connected to suitable speed reducers. For example, the first actuator 110 could be connected to a speed reducer having a reduction ratio lower than 10, while the second actuator 120 could be connected to a speed reducer having a reduction ratio greater than 10. Thus, the first actuator 110 would generate moderate torques at high speeds, while the second actuator 120 would generate high torques at low speeds.

Alternatively, the second actuator 120 could be a passive, non-electrically driven actuator. For example, the second actuator 120 could generate a torque due to the elastic potential energy of a spring or due to the gravitational potential energy of a counterweight. This solution can be particularly suitable, for example, for counterbalancing the force of gravity acting on a robotic link connected to the mechanical joint 210, so as to compensate for its effects.

FIG. 2B instead shows an embodiment of the invention in which the first actuator 110 and the second actuator 120 are linear actuators and the elastic element 125 is also of the linear type. In particular, in this solution, the first actuator 110 is a voice coil actuator comprising a coil 115 and four permanent magnets 116. In this embodiment, the linear motion produced by the actuator 110 acts by translating the septum of the hydraulic cylinder 150, and therefore by varying the pressure difference ΔP between the hydraulic lines 151 and 152, adapted to be connected to the outlets 151' and 152'.

Figure 3A:
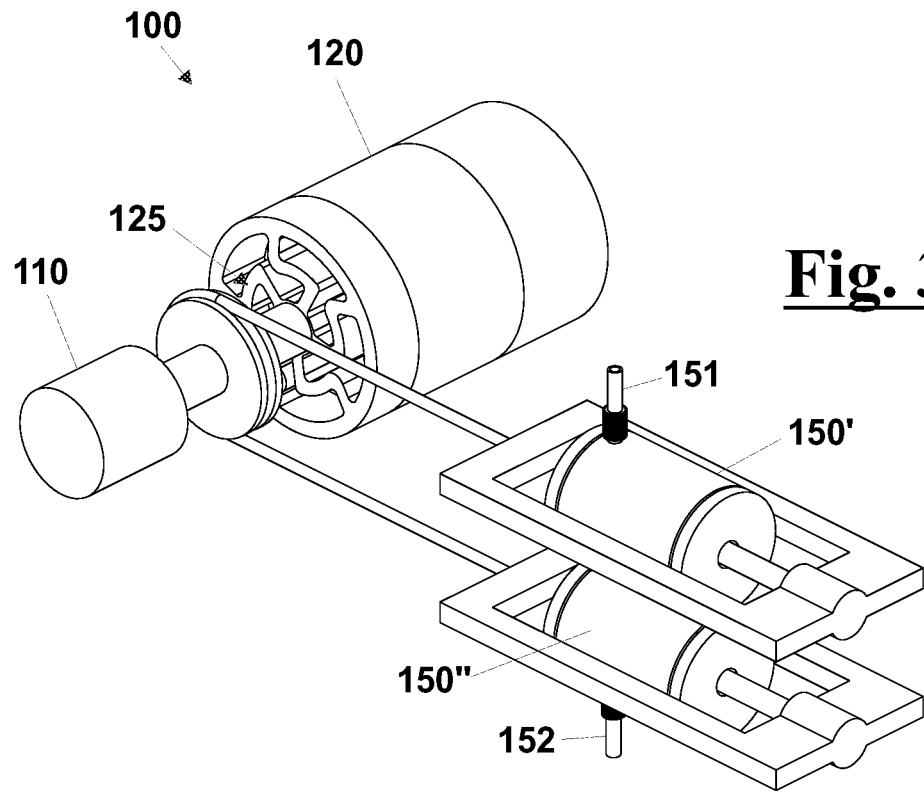
FIGS. 3A and 3B show two possible embodiments of an actuation group of the system, wherein two transmission hydraulic cylinders are provided.
Figure 3B:
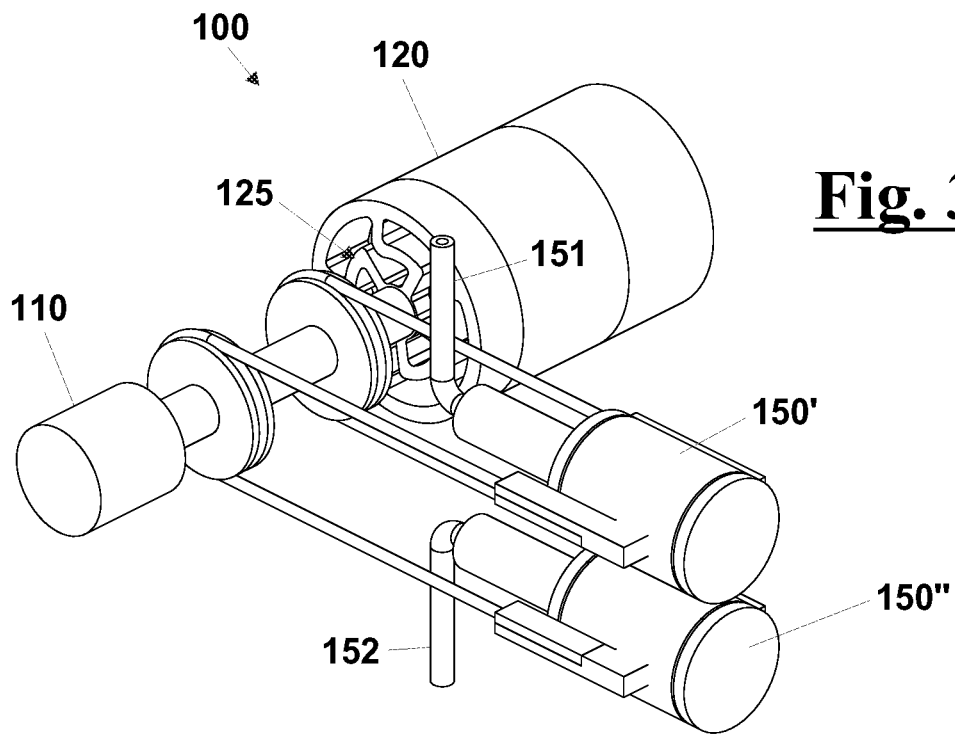

FIGS. 3A and 3B show two embodiments of the invention in which, similarly to the diagram of FIG. 1B, there are two transmission hydraulic cylinders 150' and 150" connected to a transmission which transforms the rotary motion of the actuators 110 and 120 in linear motion.

In particular, in the solution of FIG. 3A, thanks to this transmission system, the mobile septa of the hydraulic cylinders 150' and 150" translate in the opposite direction with respect to each other, increasing the pressure in the internal chamber of a first cylinder and reducing it in the other, so as to suitably vary the pressure difference ΔP between the hydraulic lines 151 and 152, suitable for being connected to the outlets 151' and 152'.

In the solution of FIG. 3B, on the other hand, the internal septa remain fixed while the external cylindrical bodies of the hydraulic cylinders 150' and 150" translate in the opposite direction with respect to each other, generating the same effect as in the solution of FIG. 3A.

Figure 4:
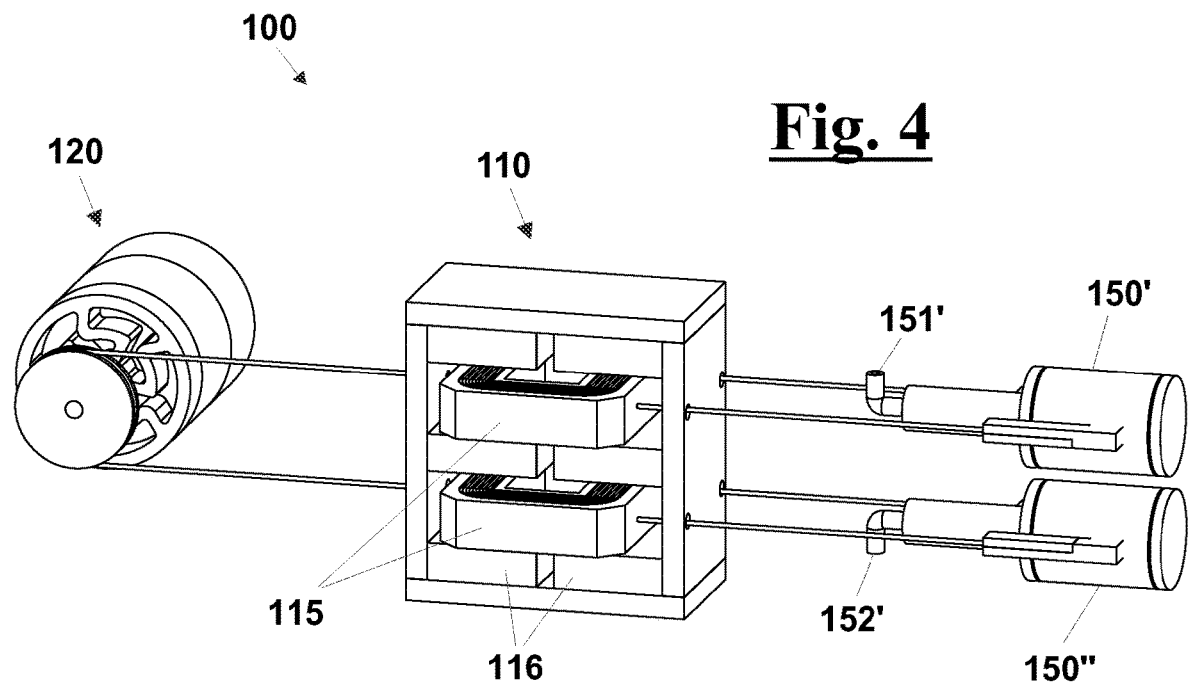
FIG. 4 shows a possible embodiment of an actuation group of the system, wherein the first actuator is a voice coil actuator comprising two stacked coils.

FIG. 4 shows a variant embodiment of the solution shown in FIG. 2B, in which two transmission hydraulic cylinders 150',150" are provided and in which the first actuator 110 comprises two coils 115 stacked one on top of the other, separated by permanent magnets 116, able to transmit the motion to both hydraulic cylinders 150',150".

Figure 4A:
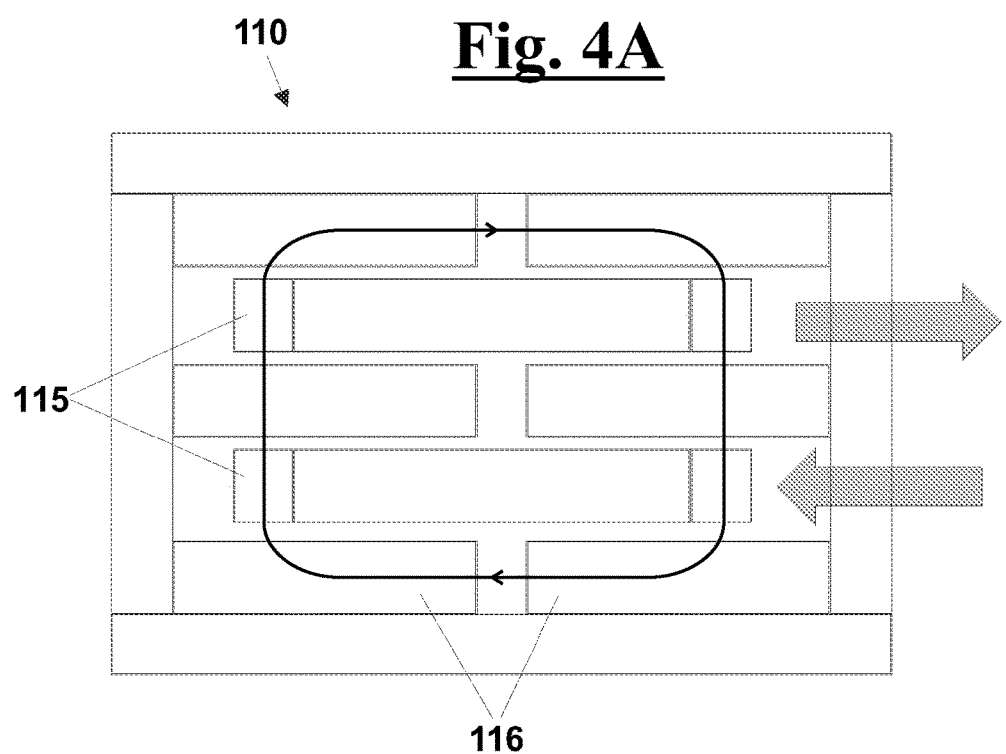
FIG. 4A diagrammatically shows the operation of the voice coil actuator of FIG. 4.

As shown in FIG. 4A, in this embodiment, the two coils 115, thanks to their overlapping position, make use of the same magnetic field, schematized in the figure by means of the circular arrow. As shown by the lateral gray arrows, the two coils 115 move in opposite directions to each other, so as to suitably vary the pressure difference ΔP between the hydraulic lines 151 and 152, suitable for being connected to the outlets 151' and 152', in a completely analogous way to what is described for the embodiments of FIGS. 3A and 3B.

FIG. 5 shows an embodiment of the invention in which the actuation unit 11 comprises three actuation groups 100 of the type shown in FIG. 4, in which the first actuators 110 are voice coil actuators superimposed on each other, so as to take advantage of the same magnetic field, reducing the overall weight and size of the actuation unit 11.

Figure 6A:
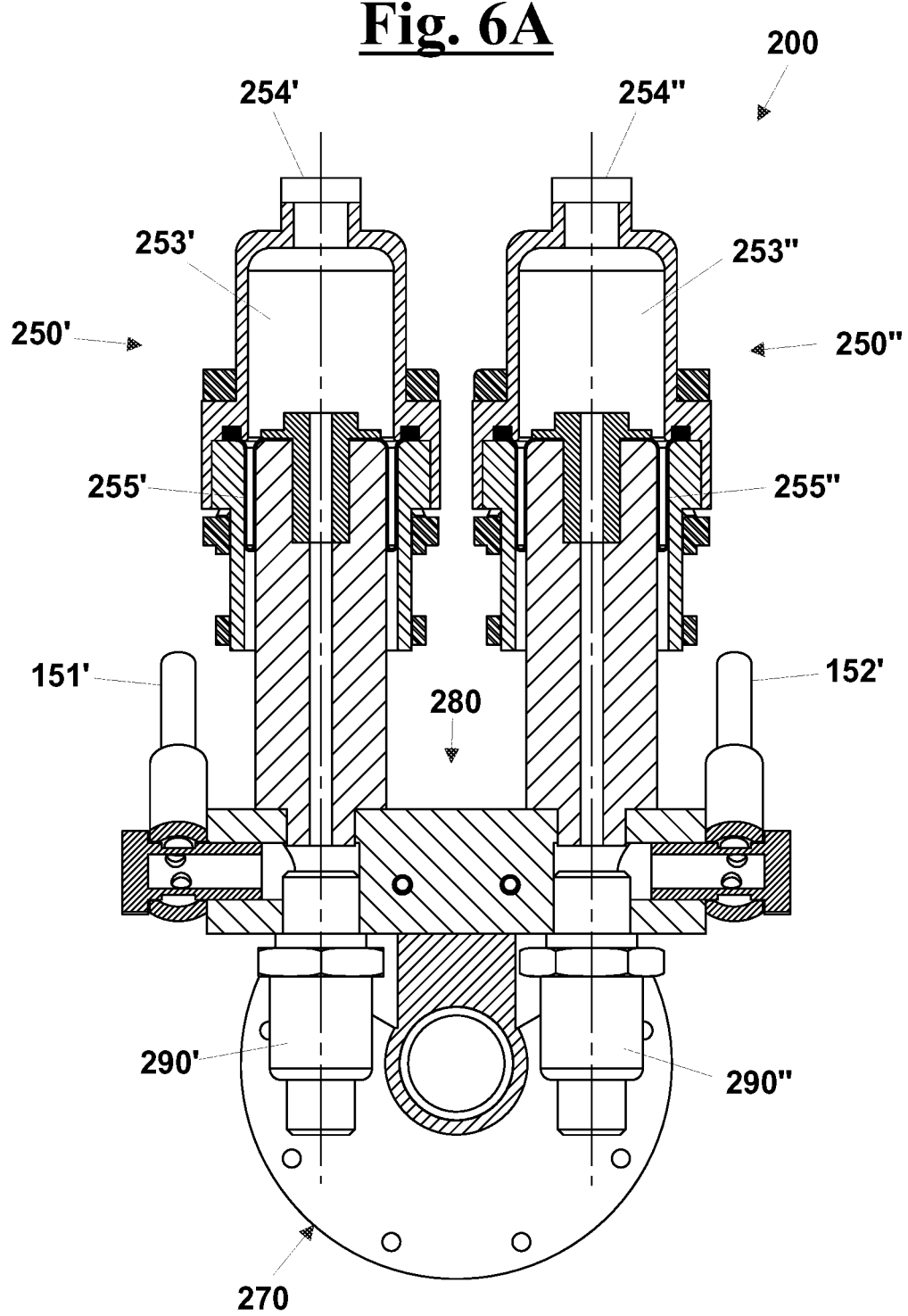
FIG. 6A shows a section of the actuated group of FIG. 6.

FIGS. 6 and 6A show a possible mechanical embodiment of the actuated group 200, in which the receiving hydraulic cylinders 250',250" are floating cylinders connected, by means of a belt 260, to a pulley 270 able to rotate as a result of the variation of relative position between the cylinders themselves.

In particular, the fluid coming from the hydraulic lines 151 and 152 is conveyed, through the outlets 151' and 152' and the manifold 280, towards the respective chambers 253' and 253" watertight sealed by the rolling diaphragms 255' and 255", able to slide to translate the cylinders 250' and 250". In this way, the pressure difference ΔP present between the hydraulic lines 151 and 152 is transmitted to the rolling diaphragms 255' and 255", generating a translation in the opposite direction of the receiving hydraulic cylinders 250' and 250". This translation generates, by means of the belt 260, the transmission of a torque to the pulley 280 which in turn drives the mechanical joint 210 (not shown in the figure).

In this embodiment, the manifold 280, in addition to allowing the fluid to be conveyed into the chambers 253' and 253", acts as a structural element of the actuated joint 200, supporting the rotation axis of the pulley 270 and the static elements of the two hydraulic cylinders 250' and 250". Furthermore, the manifold 280 allows the housing of two pressure sensors 290' and 290" near the hydraulic cylinders 250' and 250" which allow a possible position and/or force control in closed loop.

In particular, the hydraulic cylinders 250' and 250" are equipped with bleed valves 254' and 254" suitable for allowing the replacement of the fluid in the two hydraulic lines 151 and 152 and the evacuation of gas and air.

This construction solution is extremely compact and functional, making it optimal for installation on board the articulated mechanism, in particular an industrial robot.

Figure 7:
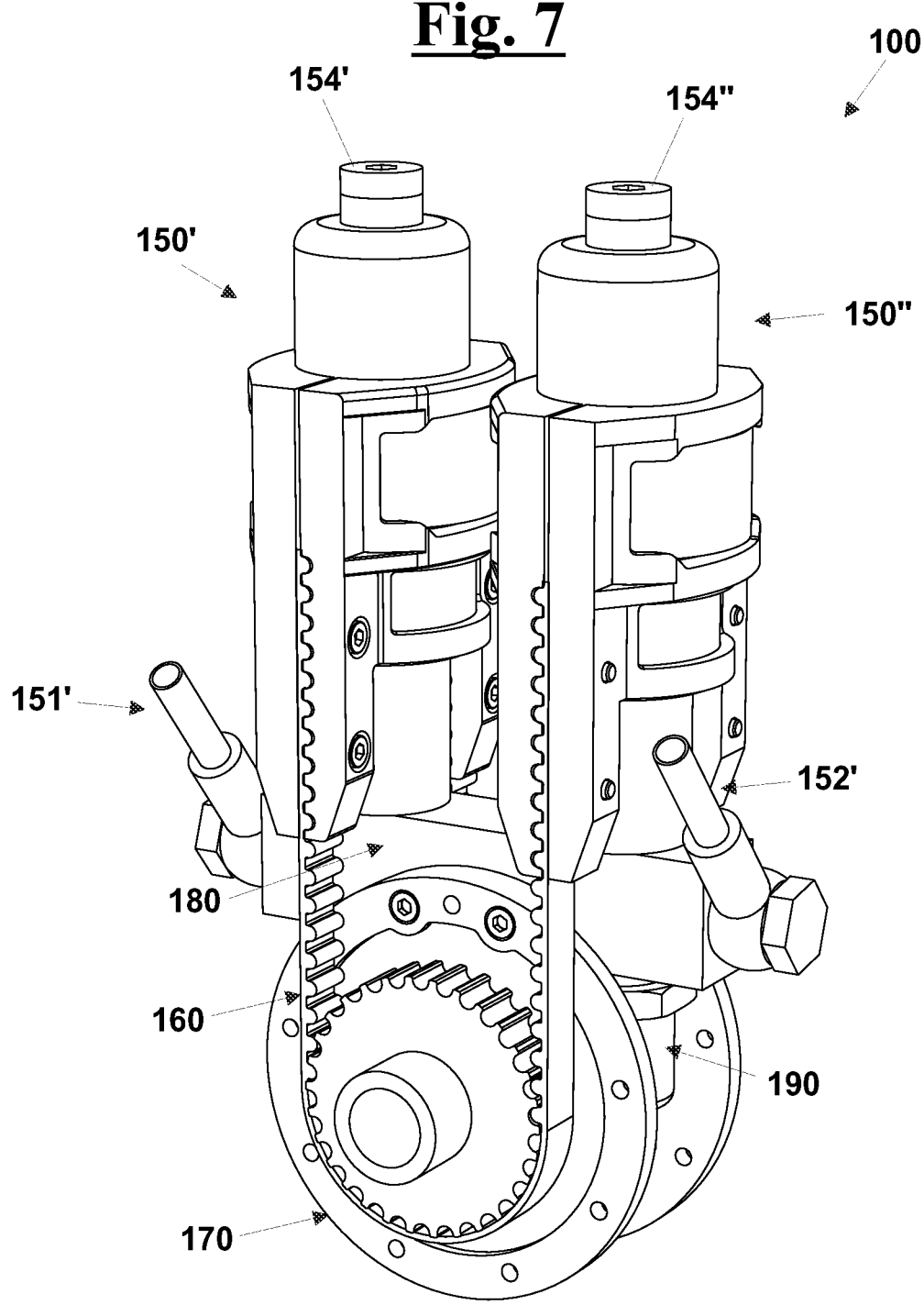
FIG. 7 shows a possible mechanical solution of the cylinders of the actuation group.

With reference to FIG. 7, the present invention provides that this mechanical solution can be used in a completely analogous way also for the actuation joint 100, replacing the receiving hydraulic cylinders 250' and 250" with the transmission hydraulic cylinders 150' and 150". In this case, the pulley 170 is actuated by the actuators 110 and 120, causing the floating cylinders 150' and 150' to translate in the opposite direction to each other, thanks to the belt 160, so as to produce the desired pressure difference ΔP between the hydraulic lines 151 and 152. In this case, thanks to the rolling diaphragms, present both in the transmission hydraulic cylinders 150', and 150" and in the receiving hydraulic cylinders 250' and 250", the fluid present in each hydraulic line 151,152 appears to move in a closed system delimited by the respective chambers of the hydraulic cylinders present in the actuation joint 100 and in the actuated joint 200.

Figure 8:
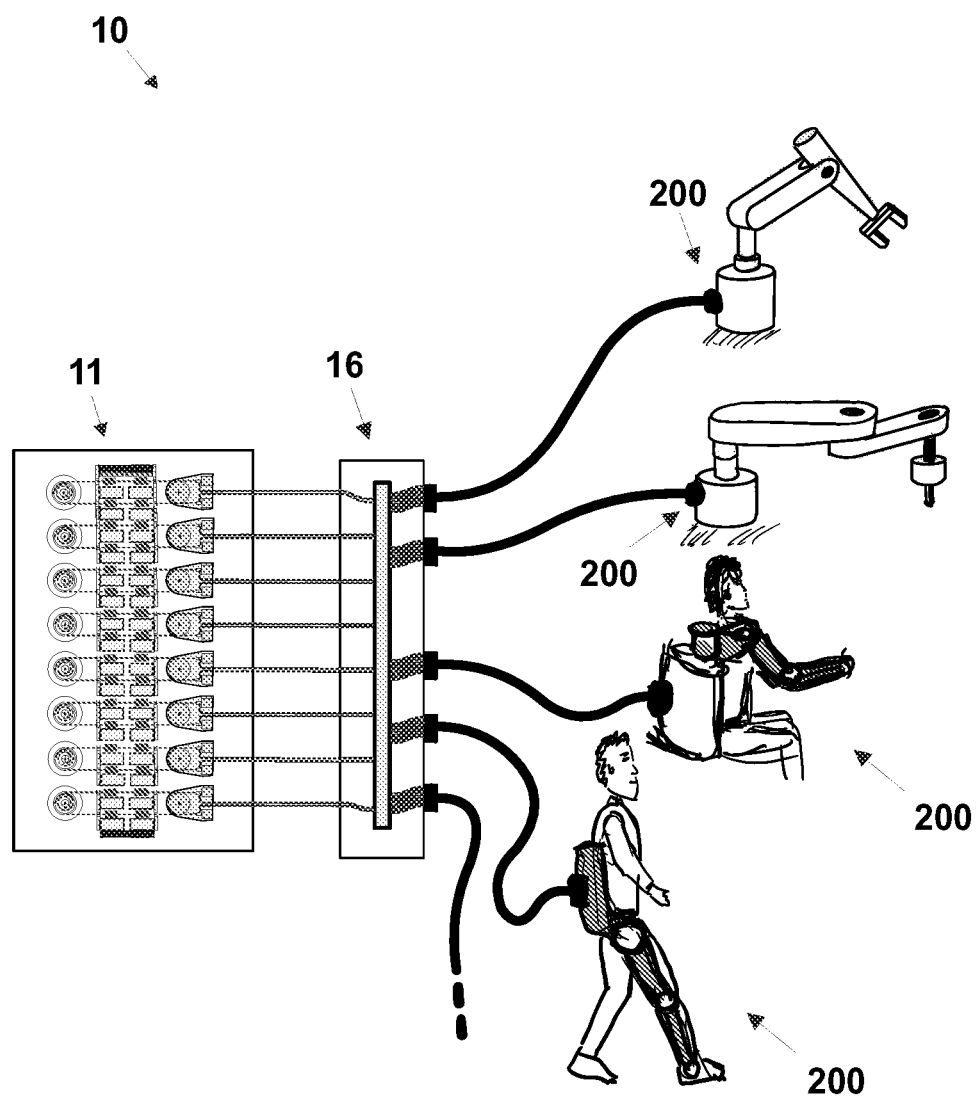
FIG. 8 diagrammatically shows an embodiment of the system for the remote actuation of articulated mechanisms, wherein a switching system s also provided.

FIG. 8 shows a possible embodiment of the system 10 for the remote actuation of articulated mechanisms, according to the present invention, which also includes a switching system 16 which allows each actuation group 100 to alternately connect to different actuated groups 200 and therefore to various articulated mechanisms. In this way, it is possible to use a lower number of actuation groups 100 with respect to the articulated mechanisms to be actuated, reducing costs and overall dimensions of the system 10.

In particular, the switching system 16 can comprise hydraulic valves able to connect and disconnect the actuated groups 200 to a specific actuation group 100 or, also, to reverse the connection of two actuated groups 200 to the respective actuation groups 100, in case that the actuation groups 100 are different from each other and it is desired to vary the type of actuation of the articulated mechanisms.

Alternatively, the switching system 16 may simply comprise mechanisms for quick coupling and release of the hydraulic lines 151 and 152, so as to allow manual or mechanical connection and disconnection of an actuated group 200 from a respective actuation group 100.

The foregoing description embodiments of the invention will so fully reveal the invention according to the conceptual point of view, so that others, by applying current knowledge, will be able to modify and/or adapt for various applications such embodiment without further research and without parting from the invention, and, accordingly, it is therefore to be understood that such adaptations and modifications will have to be considered as equivalent to the specific embodiments. The means and the materials to realise the different functions described herein could have a different nature without, for this reason, departing from the field of the invention. It is to be understood that the phraseology or terminology that is employed herein is for the purpose of description and not of limitation.

The invention claimed is:

1. A system for the remote actuation of articulated mechanisms, said system comprising:
    at least one actuated group comprising:
        a mechanical joint having at least one degree of freedom;
        at least one receiving hydraulic cylinder connected to said mechanical joint;
    a hydraulic transmission comprising, for each actuated group, a first hydraulic line and a second hydraulic line arranged to actuate said or each receiving hydraulic cylinder in order to generate a mechanical action on said mechanical joint proportional to a pressure difference $\Delta P = P_1 - P_2$, where $P_1$ is the fluid pressure in said first hydraulic line and $P_2$ is the fluid pressure in said second hydraulic line;
    an actuation unit comprising at least one actuation group configured for being connected to a respective actuated group by said first hydraulic line and said second hydraulic line, said or each actuation group comprising at least one transmission hydraulic cylinder (150,150', 150") arranged to vary said pressure difference $\Delta P$ present between said first hydraulic line and said second hydraulic line;
    said or each actuation group comprising a first actuator arranged to actuate said or each transmission hydraulic cylinder in order to generate a pressure difference $\Delta P = \Delta P_L$,
    wherein said or each actuation group also comprises a second actuator arranged to actuate said or each transmission hydraulic cylinder in order to generate a pressure difference $\Delta P = \Delta P_H > 5 * \Delta P_L$.

2. The system for the remote actuation of articulated mechanisms, according to claim 1, wherein said second actuator is an electric actuator having a speed reducer with a reduction ratio higher than 10.

3. The system for the remote actuation of articulated mechanisms, according to claim 1, wherein said second actuator is connected in series with an elastic element.

4. The system for the remote actuation of articulated mechanisms, according to claim 1, wherein said first actuator is an electric actuator having a speed reducer with a reduction ratio less than 10.

5. The system for the remote actuation of articulated mechanisms, according to claim 1, wherein said first actuator is a voice coil actuator.

6. The system for the remote actuation of articulated mechanisms, according to claim 5, wherein said first actuator comprises two coils superimposed on each other, in order to share a same magnetic field.

7. The system for the remote actuation of articulated mechanisms, according to claim 1, wherein said second actuator is arranged to convert elastic and/or gravitational potential energy into a mechanical action on said or each transmission hydraulic cylinder in order to generate said pressure difference $\Delta P_H$.

8. The system for the remote actuation of articulated mechanisms, according to claim 1, wherein said or each actuated group comprises:
    a first receiving hydraulic cylinder arranged to actuate said mechanical joint in a first direction; and
    a second receiving hydraulic cylinder arranged to actuate said mechanical joint in a second direction.

9. The system for the remote actuation of articulated mechanisms, according to claim 1, wherein said or each actuation group comprises a first transmission hydraulic cylinder and a second transmission hydraulic cylinder.

10. The system for the remote actuation of articulated mechanisms, according to claim 8, wherein said first transmission hydraulic cylinder is adapted to be connected to a respective first receiving hydraulic cylinder by a respective first hydraulic line and said second transmission hydraulic cylinder is adapted to be connected to a respective second receiving hydraulic cylinder by means of a respective second hydraulic line.

11. The system for the remote actuation of articulated mechanisms, according to claim 8, wherein said first receiving hydraulic cylinder and said second receiving hydraulic cylinder are connected by means of a belt to a pulley arranged to rotate due to the alternating movement of said receiving hydraulic cylinders.

12. The system for the remote actuation of articulated mechanisms, according to claim 9, wherein said first transmission hydraulic cylinder and said second transmission hydraulic cylinder are connected by means of a belt to a pulley arranged to be rotated by said first actuator and by said second actuator producing a relative position variation between said transmission hydraulic cylinders.

13. The system for the remote actuation of articulated mechanisms, according to claim 1, wherein said actuation unit comprises at least two actuation groups and said system is arranged to actuate at least two mechanical joints.

14. The system for the remote actuation of articulated mechanisms, according to claim 5, wherein said at least two voice coil actuators are superimposed on each other, in order to share a same magnetic field.

15. The system for the remote actuation of articulated mechanisms, according to claim 1, wherein a switching system is also provided arranged to allow the connection of an actuation group alternatively with the hydraulic lines of at least two mechanical joints.

\* \* \* \* \*